United States Patent
Lighty et al.

(10) Patent No.: US 11,143,103 B2
(45) Date of Patent: Oct. 12, 2021

(54) NOSE CONE AND FAN ASSEMBLY

(71) Applicants: Rolls-Royce Corporation, Indianapolis, IN (US); Rolls-Royce North American Technologies Inc., Indianapolis, IN (US)

(72) Inventors: Kerry Lighty, Plainfield, IN (US); Melissa Hughes, Indianapolis, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 264 days.

(21) Appl. No.: 16/380,431

(22) Filed: Apr. 10, 2019

(65) Prior Publication Data

US 2020/0325823 A1    Oct. 15, 2020

(51) Int. Cl.
*F01D 5/02* (2006.01)
*F02C 7/04* (2006.01)

(52) U.S. Cl.
CPC .............. *F02C 7/04* (2013.01); *F01D 5/02* (2013.01); *F05D 2220/32* (2013.01); *F05D 2240/24* (2013.01)

(58) Field of Classification Search
CPC .......... F02C 7/04; F01D 5/02; F05D 2220/32; F05D 2240/24
See application file for complete search history.

(56) References Cited

U.S. PATENT DOCUMENTS

| | | | |
|---|---|---|---|
| 8,540,492 B2* | 9/2013 | Schreiber | F02C 7/04 416/245 R |
| 8,858,180 B2 | 10/2014 | Breakwell | |
| 9,926,798 B2 | 3/2018 | Vest | |
| 9,970,297 B2 | 5/2018 | Vest | |
| 10,927,843 B2* | 2/2021 | Roach | F04D 29/322 |
| 2011/0085914 A1* | 4/2011 | Breakwell | F02C 7/04 416/248 |
| 2016/0159488 A1* | 6/2016 | Roach | F01D 5/02 416/245 R |
| 2016/0237897 A1* | 8/2016 | Kling | F02C 3/04 |
| 2018/0017071 A1* | 1/2018 | Hall | F04D 29/644 |
| 2018/0094582 A1* | 4/2018 | Rosenau | F02K 3/06 |
| 2018/0119614 A1* | 5/2018 | Scott | F02C 7/04 |
| 2018/0119615 A1* | 5/2018 | Scott | B64C 11/14 |
| 2018/0119616 A1* | 5/2018 | Scott | F02C 7/04 |

* cited by examiner

*Primary Examiner* — Aaron R Eastman
(74) *Attorney, Agent, or Firm* — Crowell & Moring

(57) ABSTRACT

A nose cone and fan assembly are disclosed. The fan assembly comprises a fan rotor and a nose cone retention flange. The fan rotor at least partly defines a fan assembly air flow boundary surface. The nose cone retention flange extends from the fan rotor and comprises a retention flange air flow boundary surface adjacent the fan assembly air flow boundary surface and a nose cone mating surface. The nose cone comprises a nose cone flange having a rotor mating surface. The nose cone is affixed to the nose cone retention flange with the rotor mating surface overlaying the nose cone mating surface of the nose cone retention flange.

20 Claims, 3 Drawing Sheets

NOSE CONE AND FAN ASSEMBLY

BACKGROUND

Nose cones are commonly mounted to the upstream side of a fan assembly or turbine to improve airflow into the fan or turbine and to avoid or limit damage caused by impinging foreign objects. Nose cones must be designed to withstand a wide range of operating conditions, including extreme temperatures, high rotational speeds, ice and/or bird impingement, and, in the case of turbines used with aircraft or missiles, high velocity flight. To remain effective through these wide-ranging conditions, a nose cone requires an effective system for mounting the nose cone to the fan assembly or turbine.

SUMMARY

According to some aspects of the present disclosure, a nose cone and fan assembly are disclosed. The fan assembly comprises a fan shaft, a fan rotor, a plurality of fan blades, and a nose cone retention flange. The fan rotor is carried by the fan shaft and comprises a radially outward fan blade retention surface. The plurality of fan blades are retained by and extend radially outward from said fan blade retention surface. The plurality of fan blades and/or said fan blade retention surface form a fan assembly air flow boundary surface at the root of said fan blades. The nose cone retention flange extends axially forward from said fan rotor. The nose cone retention flange comprises a conical air flow boundary surface adjacent said fan assembly air flow boundary surface, and a conical nose cone mating surface extending axially forward from said conical air flow boundary surface. The nose cone comprises a nose cone flange extending radially around a central axis and axially from an apex of said nose cone to a base portion of said nose cone. The nose cone flange forms a nose cone air flow boundary surface from the apex to the base portion and a rotor mating surface adjacent the base portion. The nose cone is affixed to said nose cone retention flange with said rotor mating surface overlaying said conical nose cone mating surface of said retention flange.

In some embodiments said fan rotor and said plurality of fan blades are integrally formed as a bladed disk. In some embodiments the nose cone defines a plurality of nose cone apertures and the nose cone is coupled to the nose cone retention flange with a respective fastener of one or more fasteners passing through a respective one of the plurality of nose cone apertures and the nose cone retention flange. In some embodiments each of said plurality of nose cone apertures comprise a countersink dimensioned to receive a head of a respective fastener. In some embodiments the nose cone and fan assembly further comprises one or more washers, at least one of said one or more washers positioned in a countersink and retained by a respective head of a fastener.

In some embodiments the nose cone retention flange is annular. In some embodiments the nose cone retention flange comprises two or more discrete flanges spaced about a circumference of the fan rotor. In some embodiments the nose cone flange extends radially around the central axis to form a parabolic nose cone air flow boundary surface. In some embodiments the nose cone flange extends radially around the central axis to form a frustoconical nose cone air flow boundary surface.

In some embodiments the nose cone comprises composite coated with a reinforcement material. In some embodiments the nose cone comprises plastic. In some embodiments the nose cone mating surface is displaced from the conical air flow boundary surface by a radial step, and wherein said nose cone is positioned adjacent said radial step. In some embodiments a continuous air flow boundary surface extends axially from the apex of the nose cone past the plurality of fan blades, the continuous air flow boundary surface comprising the nose cone air flow boundary surface, the conical air flow boundary surface, and the fan assembly air flow boundary surface.

According to further aspects of the present disclosure, a system comprises a fan assembly and a nose cone. The fan assembly comprises a fan shaft, a fan rotor, a plurality of fan blades, and a nose cone retention flange. The fan rotor is carried by said fan shaft and comprises a radially outward fan blade retention surface. The plurality of fan blades are retained by and extend radially outward from said fan blade retention surface. Each of said plurality of fan blades extend from a blade root to a blade tip. Each blade root of the plurality of fan blades and said fan blade retention surface form a fan assembly air flow boundary surface. The nose cone retention flange extends axially forward from said fan rotor. The nose cone retention flange comprises a retention flange air flow boundary surface continuous with said fan assembly air flow boundary surface. The nose cone mating surface extends axially forward from said retention flange air flow boundary surface.

The nose cone comprises a nose cone flange extending radially around a central axis and axially from an apex of said nose cone to a base portion of said nose cone. The nose cone flange forms a nose cone air flow boundary surface from the apex to the base portion and a rotor mating surface adjacent the base portion. The nose cone is affixed to said nose cone retention flange with said rotor mating surface overlaying said nose cone mating surface of said retention flange.

In some embodiments a fan inlet air flow boundary surface extends axially from the apex of the nose cone past the plurality of fan blades, the fan inlet air flow boundary surface comprising the nose cone air flow boundary surface, the retention flange air flow boundary surface, and the fan assembly air flow boundary surface.

According to still further aspects of the present disclosure, a method of coupling a nose cone to a turbine is provided. The method comprises providing a fan assembly comprising: a plurality of fan blades extending outwardly from a fan blade retention surface of a fan rotor, the plurality of fan blades and the fan blade retention surface forming a fan assembly air flow boundary surface; and a nose cone retention flange extending axially forward from said fan rotor, the nose cone retention flange comprising a conical air flow boundary surface adjacent the fan assembly air flow boundary surface and a nose cone mating surface; positioning a nose cone relative to the fan assembly, the nose cone comprising a nose cone flange extending radially around a central axis and axially from an apex of said nose cone to a base portion of said nose cone, the nose cone flange forming a rotor mating surface at the base portion and positioned with the rotor mating surface overlaying the nose cone mating surface of the nose cone retention flange; and affixing the nose cone to the nose cone retention flange.

In some embodiments the nose cone defines a plurality of nose cone apertures, and wherein the step of affixing the nose cone to the nose cone retention flange comprises passing a respective fastener through each of the plurality of apertures and through the nose cone retention flange. In some embodiments the step of affixing the nose cone to the nose cone retention flange further comprises coupling each respective fastener to a captive nut retained by the nose cone retention flange. In some embodiments the step of affixing the nose cone to the nose cone retention flange further comprises positioning a head of the fastener in a countersink defined by the nose cone. In some embodiments the step of affixing the nose cone to the nose cone retention flange further comprises positioning one or more washers in a respective countersink and retaining said one or more washers with said head of said fastener.

BRIEF DESCRIPTION OF THE DRAWINGS

The following will be apparent from elements of the figures, which are provided for illustrative purposes.

Figure 1:
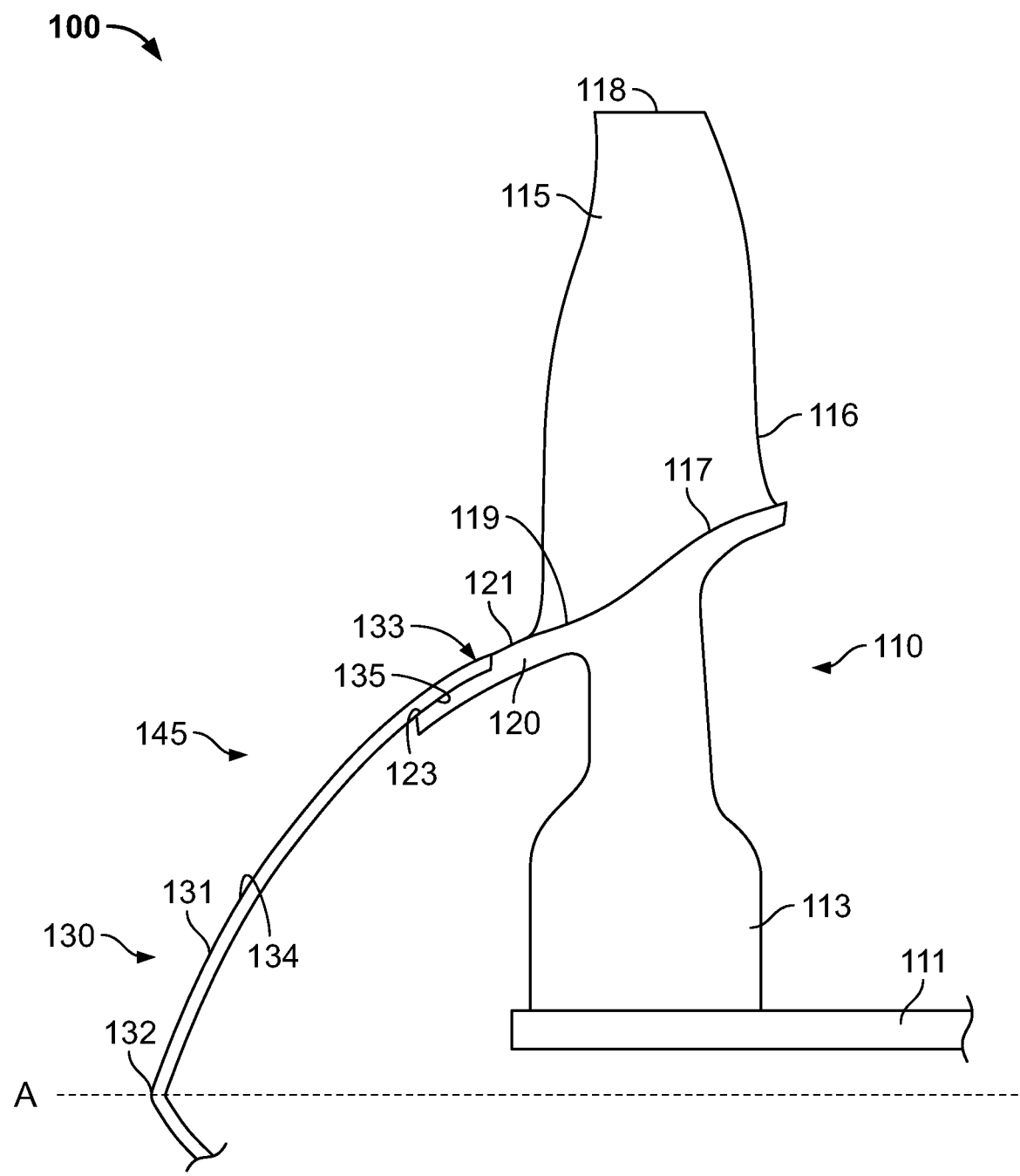
FIG. 1 is a cross sectional schematic view of a nose cone and fan assembly in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Nose cones are typically mounted to a fan assembly in an axial mounting configuration. The fan assembly comprises a plurality of blades extending radially from a central rotor. The central rotor defines an axis of rotation. In a typical mounting configuration, a flange extends from the rotor to present a radially-extending and axially-facing surface to an interior portion of the nose cone. An opposing flange extends from the interior of the nose cone and is mated to the rotor flange via an axially oriented fastener. This typical mounting configuration is, relatively speaking, both heavy and expensive to manufacture due to the need for axially-facing flanges of the rotor and nose cone, as well as the need for a smooth flowpath surface along the exterior of the nose cone.

Since the typical mounting configuration is both relatively heavy and expensive to manufacture, it is an especially poor fit for expendable (i.e. single use) and attritable (i.e. few uses) applications. Such applications, which includes missiles and low-use drones, prioritize an inexpensive manufacturing technique because durability of the mounting configuration is of less concern.

The present disclosure is therefore directed to systems and methods of mounting a nose cone to a fan assembly along the nose cone flowpath surface. The nose cone and fan assembly disclosed herein provide a mounting solution that reduces the weight of the nose cone and fan assembly, and is less expensive and less complex to manufacture and mount.

Figure 2:
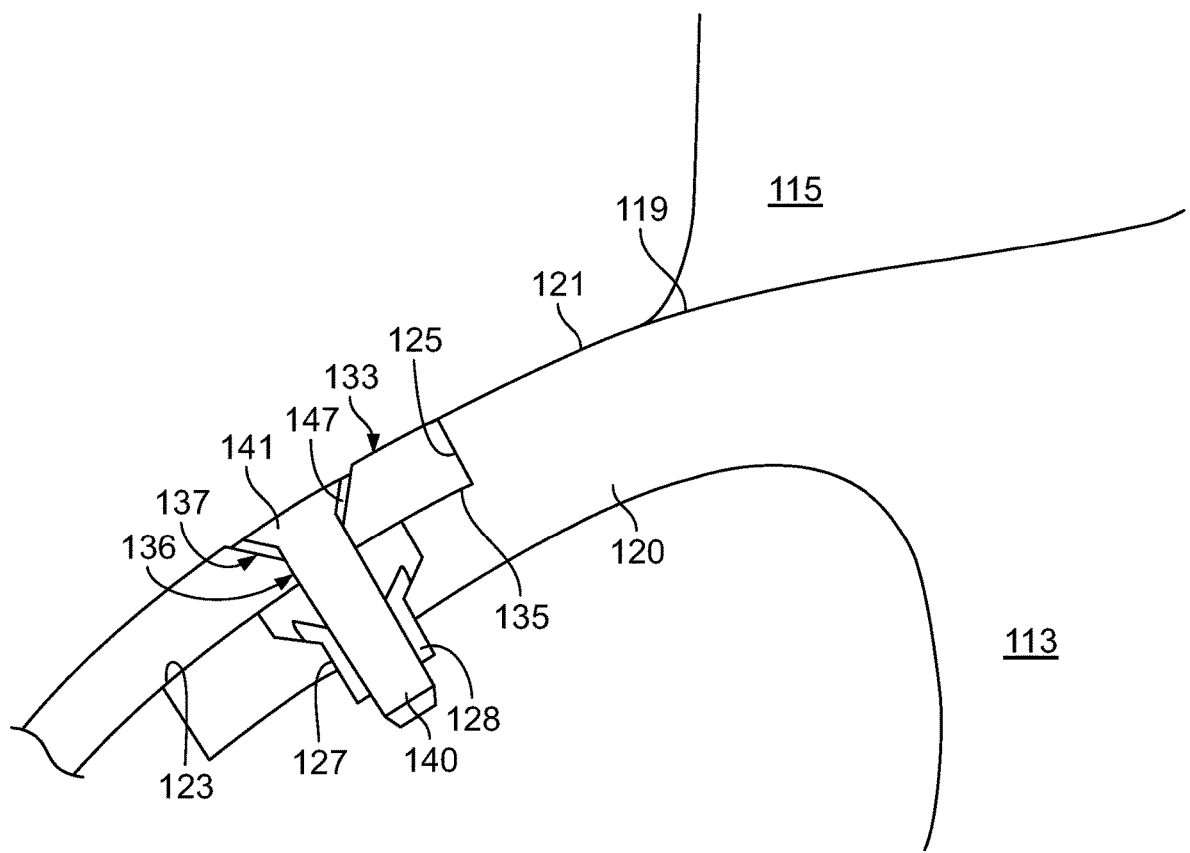
FIG. 2 is a detailed cross sectional schematic view of a nose cone and fan assembly in accordance with some embodiments of the present disclosure.

FIG. 1 is a cross sectional schematic view of a nose cone and fan assembly. FIG. 2 is a detailed cross sectional schematic view of a nose cone and fan assembly. A system or assembly 100 of the present disclosure may comprise a fan assembly 110 and a nose cone 130. The present disclosure may be directed to a system 100 for mounting a nose cone 130 to a fan assembly 110.

The fan assembly 110 may comprise a fan shaft 111, a fan rotor 113, and a plurality of fan blades 115. The fan shaft 111 may define an axis of rotation A of the fan assembly 110. The fan shaft 111 may drive the fan assembly 110, and may be operably coupled to a compressor and/or turbine of the rotating machine.

The fan rotor 113 may be carried by the fan shaft 111. The fan rotor 113 may be annular or disc-shaped. The fan rotor 113 may comprise a radially outward fan blade retention surface 117. The fan rotor 113 may be driven by the fan shaft 111.

The fan blades 115 may be evenly spaced about the outer circumference of the fan rotor 113. Each fan blade 115 may extend radially outward from the radially outward fan blade retention surface 117. Each fan blade 115 may extend radially outward from a blade root 116 to a blade tip 118.

In some embodiments, the fan blades 115 and rotor 113 may be manufactured separately and the fan blades 115 may be coupled to the rotor 113. The fan blades 115 may be retained by the radially outward fan blade retention surface 117. The fan blades 115 may be coupled to the fan rotor 113, for example by a key and keyway.

In other embodiments, the fan blades 115 and rotor 113 may be manufactured as an integral component, typically referred to as a bladed disk or blisk. In such embodiments, the radially outward fan blade retention surface 117 is the radially outward facing surface of the rotor 113 portion of the blisk. The fan blades 115 extend radially outward from the fan blade retention surface 117.

The plurality of fan blades 115 may cooperate to form a fan assembly air flow boundary surface 119. The plurality of fan blades 115 may cooperate with the radially outward fan blade retention surface 117 to form a fan assembly air flow boundary surface 119. The fan assembly air flow boundary surface 119 may be formed at the blade roots 116 of the fan blades 115. The blade roots 116 and the radially outward fan blade retention surface 117 may form the fan assembly air flow boundary surface 119.

The fan assembly 110 may further comprise a nose cone retention flange 120. The nose cone retention flange 120 may extend axially forward from the fan rotor 113. The nose cone retention flange 120 may comprise a conical air flow boundary surface 121, which may also be referred to as a retention flange air flow boundary surface. The conical air flow boundary surface 121 may be adjacent and/or continuous with the fan assembly air flow boundary surface 119. The conical air flow boundary surface 121 may be conically or frustoconically shaped.

The nose cone retention flange 120 may further comprise a conical nose cone mating surface 123 that may extend axially forward from the conical air flow boundary surface 121. The nose cone mating surface 123 may be displaced radially inward from the conical air flow boundary surface 121 and/or there may be a radial step 125 separating the nose cone mating surface 123 from the conical air flow boundary surface 121.

The nose cone retention flange 120 may define a plurality of retention flange apertures 127 that pass through the nose cone retention flange 120. The retention flange apertures 127 may be spaced about the annular nose cone retention flange 120.

The nose cone retention flange 120 may be an annular flange extending axially from the fan rotor 113 about the full circumference of the fan rotor 113. In other embodiments, the nose cone retention flange 120 may be formed as one or more discrete flanges, each extending axially from the fan rotor 113. In embodiments where the nose cone retention flange 120 is formed as more than one discrete flanges, the discrete flanges may be spaced about the circumference of the fan rotor 113.

The nose cone 130 may comprise a nose cone flange 131 extending radially about a central axis of the nose cone and extending axially from an apex 132 to a base portion 133 of the nose cone 130. As shown in FIG. 1, the central axis of the nose cone 130 may be coaxial with the axis A of the fan assembly 110. The nose cone flange 131 may form a nose cone air boundary surface 134 extending from the apex 132 to the base portion 133. The nose cone flange 131 may form a nose cone air boundary surface 134 that is parabolic or frustoconical.

The nose cone flange 131 may further form a rotor mating surface 135 adjacent the base portion 133. As shown in FIG. 2, the nose cone flange 131 may define a plurality of nose cone apertures 136 proximate the base portion 133 and/or along the rotor mating surface 135. The nose cone apertures 136 may be spaced evenly around the annular base portion 133 of the nose cone 130. Each aperture 136 may include a countersink portion 137.

The nose cone 130 may be affixed to the nose cone retention flange 120 of the fan rotor 113 with the rotor mating surface 135 overlaying the conical nose cone mating surface 123. One or more fasteners 140 may be used to affix the nose cone 130 to the nose cone retention flange 120. The nose cone 130 may be positioned relative to the nose cone retention flange 120 such that a respective one of the plurality of nose cone apertures 136 aligns with a respective one of the plurality of retention flange apertures 127. A respective fastener 140 may be passed through the aligned nose cone aperture 136 and retention flange aperture 127 to thereby affix the nose cone 130 to the retention flange 120. A captive nut 128 may be partly disposed in the retention flange aperture 127 and may retain the fastener 140 as shown in FIG. 2. The fastener 140 may comprise a head 141, and the head 141 may be disposed in the countersink portion 137 when the nose cone 130 is affixed to the retention flange 120. The head 141 and/or countersink portion 137 may be dimensioned such that the head 141 fills or substantially fills the countersink portion 137 to minimize air flow disturbances along the nose cone air flow boundary surface 134. In some embodiments the fastener 140 is a flat head screw.

The nose cone 130 may be positioned relative to the nose cone retention flange 120 such that the nose cone 130 is adjacent the radial step 125. The nose cone 130 of the present disclosure may have a conical rotor mating surface 135, and the nose cone retention flange 120 may have a conical nose cone mating surface 123. When the conical surfaces 123, 135 are joined, the nose cone 130 will radially and axially self-center relative to the rotor 113. A small gap may be present between the nose cone 130 and the radial step 125.

With the nose cone 130 affixed to the nose cone retention flange 120, a fan inlet air flow boundary surface 145 may extend axially from the apex 132 of the nose cone 130 past the fan blades 115. The fan inlet air flow boundary surface 145 may comprise all or portions of the nose cone air flow boundary surface 134, the retention flange air flow boundary surface 121, and the fan assembly air flow boundary surface 119. The fan inlet air flow boundary surface 145 may be continuous, or may present a substantially smooth air flow boundary surface.

Trim balancing of the fan assembly 100 may be accomplished with the nose cone 130 affixed to the retention flange 120 by altering the length of one or more fasteners 140. Use of varying length fasteners 140 to affix the nose cone 130 to the retention flange 120 allows for adjusting the weight of the nose cone 130 proximate the base portion 133, and thus for trim balancing the fan assembly 100 in advance of the high rotational speeds experienced during operation. Alternatively, fasteners 140 of varying density materials—and thus of varying weights—may be used to allow for adjusting the weight of the nose cone 130 proximate the base portion 133.

As yet another means of performing trim balancing, one or more weighted washers 147 may be positioned in the countersink 137 and/or aperture 136 defined by the nose cone 130. The weighted washer 147 may be retained by the head 141 of the fastener 140, and varying the weight of one or more weighted washers 147 or removing the weighted washers 147 allows for adjusting the weight of the nose cone 130 proximate the base portion 133. While the washer 147 illustrated in FIG. 2 is a cone washer, using weighted washers 147 of different weights, shapes, dimensions, density, material, or geometries can alter the weight of the nose cone 130 proximate the base portion 133 to perform trim balancing.

Accessing the fasteners 140 along the nose cone air flow boundary surface 134 provides ease of access as compared to conventional mounting configurations, and thus allows for trim balancing of the fan assembly 110 with minimal disassembly.

The nose cone 130 may comprise a composite or plastic component. The nose cone 130 may be coated with a strengthening compound, such as Nanovate™. The nose cone 130 may alternatively be manufactured using advanced techniques such as additive 3D printing. A lighter weight nose cone 130 and nose cone mounting system than available in the prior art may be achieved through the use of materials such as composite, plastic, or other alternatives to metal.

Figure 3:
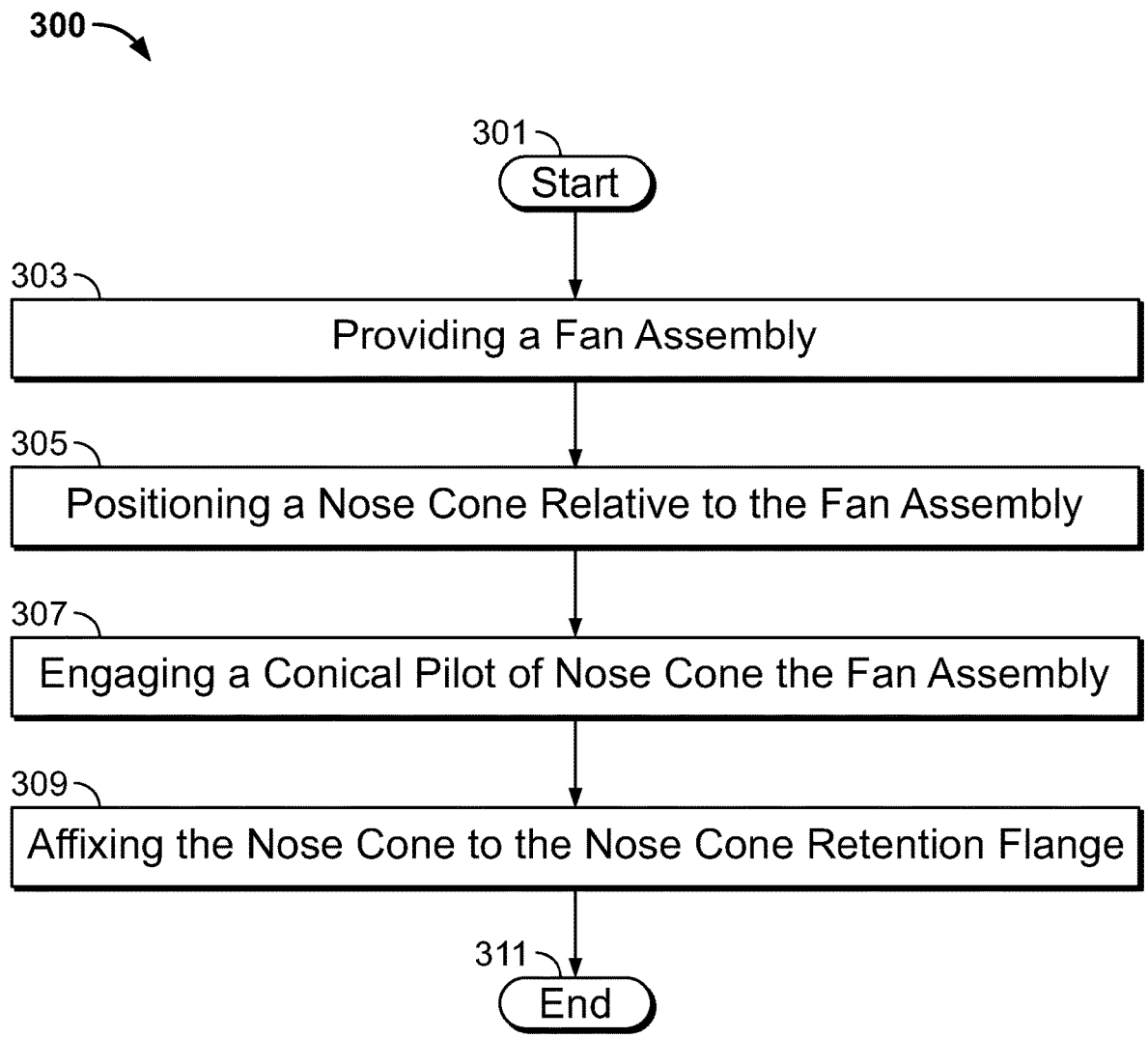
FIG. 3 is a flow diagram of a method in accordance with some embodiments of the present disclosure.

The present disclosure is additionally directed to methods of mounting a nose cone 130 to a fan assembly 110. One such method 300 is presented in the flow diagram of FIG. 3. Method 300 starts at Block 301. The steps of method 300, presented at Blocks 301 through 311, may be performed in the order presented in FIG. 3 or in another order. One or more steps of the method 300 may not be performed.

At Block 303 a fan assembly 110 is provided. The fan assembly 110 may comprise a plurality of fan blades 115 extending outwardly from a fan blade retention surface 117 of a fan rotor 113, the plurality of fan blades 115 and the fan blade retention surface 117 forming a fan assembly air flow boundary surface 119. The fan assembly 110 may further comprise a nose cone retention flange 120 extending axially forward from the fan rotor 113, the nose cone retention flange 120 comprising a conical air flow boundary surface 121 adjacent the fan assembly air flow boundary surface 119 and a nose cone mating surface 123.

At Block 305, a nose cone 130 is positioned relative to the fan assembly 110. The nose cone 130 may comprise a nose cone flange 131 extending radially around a central axis and axially from an apex 132 of the nose cone 130 to a base portion 133 of the nose cone 130. The nose cone flange 131 may form a rotor mating surface 135 at the base portion 133 and may be positioned with the rotor mating surface 135 overlaying the nose cone mating surface 123 of the nose cone retention flange 120.

At Block 307, a conical pilot of the nose cone may be engaged with a corresponding structure of the fan assembly.

At Block 309, the nose cone 130 may be affixed to the nose cone retention flange 120. The nose cone 130 may define a plurality of nose cone apertures 136, and a respective fastener 140 may be passed through each of the plurality of nose cone apertures 136 and through the nose cone retention flange 120. Each respective fastener 140 may be coupled to a captive nut 128 retained by the nose cone retention flange 120. A head 141 of each fastener 140 may be positioned in a countersink portion 137 defined by the nose cone 130.

Method 300 ends at Block 311.

The presently disclosed systems and methods are advantageous over the prior art systems and methods of mounting a nose cone to a fan assembly because the systems and methods disclosed herein provide a lighter and less expensive mounting solution. By removing the radially-extending and axially-facing flanges common in prior art nose cone mounts, the present disclosure reduces the weight associated with mounting a nose cone to a fan assembly and makes that mounting solution less expensive and easier to manufacture.

The disclosed nose cone and fan assembly additionally provide a smooth and, in some embodiments, continuous air flow boundary surface to minimize air flow disturbances and improve aerodynamic performance. A smooth and continuous air flow boundary surface may be provided fully from the apex of the nose cone and axially past the fan blades. The smooth and continuous air flow boundary surface may be defined by the nose cone air flow boundary surface, the conical air flow boundary surface, and the fan assembly air flow boundary surface.

The present disclosure may be particularly advantageous when applied to an expendable, single-use engine such as the engine of a subsonic missile. Since future engine designs for missiles will seek to reduce cost, limit part count, and ease complexity where possible, the presently disclosed systems and methods of mounting a nose cone to a fan assembly may be highly desirable. As disclosed above, the presently disclosed nose cone and mounting system may allow for a less expensive and lighter weight solution than is presently available.

While the above disclosure describes a nose cone mounted to a fan assembly, the disclosure is equally applicable to mounting a nose cone to a turbine or any bladed rotor.

Although examples are illustrated and described herein, embodiments are nevertheless not limited to the details shown, since various modifications and structural changes may be made therein by those of ordinary skill within the scope and range of equivalents of the claims.

What is claimed is:

1. A nose cone and fan assembly comprising:
    a fan assembly comprising:
        a fan shaft;
        a fan rotor carried by said fan shaft, said fan rotor comprising a radially outward fan blade retention surface;
        a plurality of fan blades retained by and extending radially outward from said fan blade retention surface, said plurality of fan blades and/or said fan blade retention surface forming a fan assembly air flow boundary surface at a root of said fan blades; and
        a nose cone retention flange including a radially inner surface and a radially outer surface, wherein the radially inner surface and the radially outer surface extend parallel to each other, the nose cone retention flange extending axially forward from said fan rotor, said nose cone retention flange comprising a conical air flow boundary surface adjacent said fan assembly air flow boundary surface, and a conical nose cone mating surface extending axially forward of said conical air flow boundary surface, wherein the conical nose cone mating surface extends parallel to the radially inner surface and the radially outer surface of the nose cone retention flange;
    and
    a nose cone comprising a nose cone flange extending radially around a central axis and axially from an apex of said nose cone to a base portion of said nose cone, said nose cone flange forming a nose cone air flow boundary surface from the apex to the base portion and a rotor mating surface adjacent the base portion, said nose cone being affixed to said nose cone retention flange with said rotor mating surface overlaying said conical nose cone mating surface of said nose cone retention flange.

2. The nose cone and fan assembly of claim 1 wherein said fan rotor and said plurality of fan blades are integrally formed as a bladed disk.

3. The nose cone and fan assembly of claim 1 wherein the nose cone defines a plurality of nose cone apertures and the nose cone is coupled to the nose cone retention flange with a respective fastener of one or more fasteners passing through a respective one of the plurality of nose cone apertures and the nose cone retention flange.

4. The nose cone and fan assembly of claim 3 wherein each of said plurality of nose cone apertures comprise a countersink dimensioned to receive a head of a respective fastener.

5. The nose cone and fan assembly of claim 4 further comprising one or more washers, at least one of said one or more washers positioned in a countersink and retained by a respective head of a fastener.

6. The nose cone and fan assembly of claim 1 wherein the nose cone retention flange is annular.

7. The nose cone and fan assembly of claim 1 wherein the nose cone retention flange comprises two or more discrete flanges spaced about a circumference of the fan rotor.

8. The nose cone and fan assembly of claim 1 wherein the nose cone flange extending radially around the central axis forms a parabolic nose cone air flow boundary surface.

9. The nose cone and fan assembly of claim 1 wherein the nose cone flange extending radially around the central axis forms a frustoconical nose cone air flow boundary surface.

10. The nose cone and fan assembly of claim 1 wherein the nose cone comprises composite coated with a reinforcement material.

11. The nose cone and fan assembly of claim 1 wherein the nose cone comprises plastic.

12. The nose cone and fan assembly of claim 1 wherein the nose cone mating surface is displaced from the conical air flow boundary surface by a radial step, and wherein said nose cone is positioned adjacent said radial step.

13. The nose cone and fan assembly of claim 1 wherein a continuous air flow boundary surface extends axially from the apex of the nose cone past the plurality of fan blades, the continuous air flow boundary surface comprising the nose cone air flow boundary surface, the conical air flow boundary surface, and the fan assembly air flow boundary surface.

14. A system comprising:
a fan assembly comprising:
a fan shaft;
a fan rotor carried by said fan shaft, said fan rotor comprising a radially outward fan blade retention surface;
a plurality of fan blades retained by and extending radially outward from said fan blade retention surface, each of said plurality of fan blades extending from a blade root to a blade tip, wherein each blade root of the plurality of fan blades and said fan blade retention surface forming a fan assembly air flow boundary surface; and
a nose cone retention flange extending axially forward from said fan rotor, said nose cone retention flange comprising a retention flange air flow boundary surface continuous with said fan assembly air flow boundary surface, and an annular nose cone mating surface extending axially forward of said retention flange air flow boundary surface, wherein the annular nose cone mating surface extends about a central axis;

and a nose cone comprising a nose cone flange extending radially around the central axis and axially from an apex of said nose cone to a base portion of said nose cone, said nose cone flange forming a nose cone air flow boundary surface from the apex to the base portion and a rotor mating surface adjacent the base portion, said nose cone being affixed to said nose cone retention flange with said rotor mating surface overlaying said nose cone mating surface of said nose cone retention flange.

15. The nose cone and fan assembly of claim 14 wherein a fan inlet air flow boundary surface extends axially from the apex of the nose cone past the plurality of fan blades, the fan inlet air flow boundary surface comprising the nose cone air flow boundary surface, the retention flange air flow boundary surface, and the fan assembly air flow boundary surface.

16. A method of coupling a nose cone to a turbine, the method comprising:
providing a fan assembly comprising:
a plurality of fan blades extending outwardly from a fan blade retention surface of a fan rotor, the plurality of fan blades and the fan blade retention surface forming a fan assembly air flow boundary surface; and
a nose cone retention flange including a radially inner surface and a radially outer surface, wherein the radially inner surface and the radially outer surface extend parallel to each other, the nose cone retention flange extending axially forward from said fan rotor, the nose cone retention flange comprising a conical air flow boundary surface adjacent the fan assembly air flow boundary surface and a nose cone mating surface, wherein the nose cone mating surface extends parallel to the radially inner surface and the radially outer surface of the nose cone retention flange;

positioning a nose cone relative to the fan assembly, the nose cone comprising a nose cone flange extending radially around a central axis and axially from an apex of said nose cone to a base portion of said nose cone, the nose cone flange forming a rotor mating surface at the base portion and positioned with the rotor mating surface overlaying the nose cone mating surface of the nose cone retention flange; and affixing the nose cone to the nose cone retention flange.

17. The method of claim 16 wherein the nose cone defines a plurality of nose cone apertures, and wherein the step of affixing the nose cone to the nose cone retention flange comprises passing a respective fastener through each of the plurality of nose cone apertures and through the nose cone retention flange.

18. The method of claim 17 wherein the step of affixing the nose cone to the nose cone retention flange further comprises coupling each respective fastener to a captive nut retained by the nose cone retention flange.

19. The method of claim 18 wherein the step of affixing the nose cone to the nose cone retention flange further comprises positioning a head of the fastener in a countersink defined by the nose cone.

20. The method of claim 19 wherein the step of affixing the nose cone to the nose cone retention flange further comprises positioning one or more washers in a respective countersink and retaining said one or more washers with said head of said fastener.

* * * * *